Sept. 28, 1943.   H. J. DE N. McCOLLUM   2,330,298
HEATING SYSTEM
Filed Jan. 9, 1941
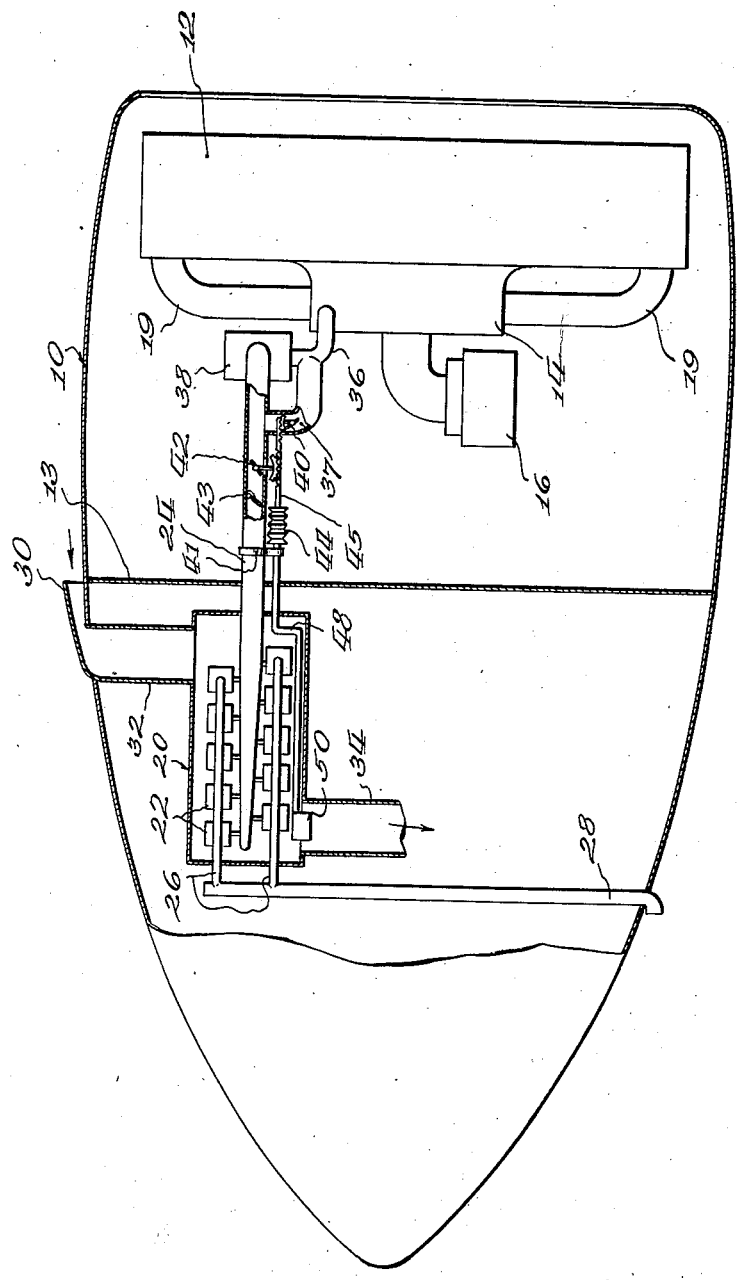
Inventor.
Henry J. DeN McCollum
By
Williams, Bradbury & Hinkle
Attys.

Patented Sept. 28, 1943

2,330,298

UNITED STATES PATENT OFFICE 2,330,298

HEATING SYSTEM

Henry J. De N. McCollum, Chicago, Ill.

Application January 9, 1941, Serial No. 373,752

7 Claims. (Cl. 237—2)

My invention relates generally to an improved heating system and more particularly to an internal combustion heating system for use in heating airplanes and other large conveyances having an internal combustion engine burning a combustible mixture of fuel and air.

It is an object of my invention to provide an improved heating system for airplanes and the like, deriving combustible mixture from the same source as the airplane engine, and maintaining the rate of supply of combustible mixture to the heating system relatively constant under all conditions of engine operation.

A further object is to provide an improved control mechanism for automatically regulating the rate that combustible mixture is supplied to an internal combustion heating system to stabilize the rate that heat is supplied by the system and to maintain the temperature of the air heated by the system relatively constant under varying conditions of operation.

A further object is to provide an improved internal combustion heating system for airplanes and the like, receiving combustible mixture from the engine supply system, and provided with means to maintain the pressure of combustible mixture supplied to the heating system uniform under varying conditions of engine operation.

Other objects will appear from the following description, reference being had to the accompanying drawing which is a diagram of my improved internal combustion heating system.

The heater, which may be of the general type disclosed in my copending application Serial No. 377,181, filed February 3, 1941, comprises a casing 20 enclosing an internal combustion heating device comprising a number of internal combustion heating units 22. Combustible mixture is supplied to the heating units through a conduit 24 and burned. The products of combustion are discharged from the heating units into a pair of exhaust manifolds 26, and conveyed to the atmosphere through an exhaust pipe 28 which terminates adjacent the outer surface of the nacelle. The discharge end of the exhaust pipe 28 is preferably so disposed with relation to the direction of flight that it is maintained at subatmospheric pressure by the motion of the plane, and the exhaust manifolds 26 and the exhaust pipe 28 are preferably of sufficient capacity to maintain the pressure within the heating units 22 less than the pressure of the air being heated. A ram 30, adjacent the outer surface of the nacelle 10 and opening in the direction of flight of the airplane, forces air through a conduit 32 into the casing 20, past the heating units 22, and through the conduit 34 to the space to be heated. If the plane has a supercharged cabin, the ram 30 may be replaced by the cabin supercharger. The conduit 34 is preferably branched to secure an even distribution of heated air in the passenger compartments of the plane.

The heater is illustrated as installed in a nacelle 10 of an airplane and separated from the engine 12 by a fire wall 13 integrally formed in the structure of the plane. Combustible mixture from a carburetor 16 is compressed in a supercharging blower 14 driven by the airplane engine and supplied to the engine cylinders through intake manifolds 19. The airplane engine drives a positive displacement pump 38, which may be of the cycloidal type. The pump 38 receives combustible mixture through a conduit 36 from a suitable point in the source of combustible mixture for the internal combustion engine, such as the housing of the supercharging blower 14. The pump 38 raises the pressure of the combustible mixture and discharges it through the conduit 24 to the heating units 22. A positive displacement pump will deliver a substantial quantity of gas from its outlet, although the pressure at its intake is quite low. The capacity of the pump 38 is sufficient to deliver enough combustible mixture to operate the heater at all times.

Inasmuch as the pump 38 is of a positive displacement type, a by-pass conduit 37, having a butterfly valve 40 therein to regulate the rate of flow of combustible mixture therethrough, provides communication between the inlet and the outlet of the pump to regulate the rate at which combustible mixture is supplied to the heating units. Although the rate of output of the pump can be controlled by an adjustable valve in series with the pump, an arrangement of this sort would cause a very large pressure differential between the inlet and outlet of the pump when it is operating at a fraction of its capacity, thereby materially increasing the power consumed. A second butterfly valve 42 is placed in the conduit 24 directly to control the rate of flow of combustible mixture therethrough. If the capacity of the by-pass conduit 37 is sufficiently large, and the capacity of the conduit 24 is so small that there is an appreciable drop in the pressure of the combustible mixture passing therethrough under normal conditions of operation, the valve 42 may be omitted and the rate of flow of the combustible mixture may be controlled by valve 40 alone. A check valve 43 in the conduit 24 prevents backfiring of the combustible mixture therethrough.

The butterfly valves 40 and 42 are thermostatically controlled to regulate the rate at which combustible mixture is supplied to the heating units 22 so that the resulting temperature of the heated air passing into the airplane cabin remains substantially constant. A bulb 50, filled with a liquid having a suitable vapor pressure-temperature relationship such as an alcohol-ether mixture, is placed in the outlet of the heater casing 20. This bulb communicates through a conduit 48 with a bellows 44. As the temperature of the heated air rises, the vapor pressure of the alcohol-ether mixture in the bulb 50 rises and causes the bellows 44 to elongate. One end of the bellows 44 is held stationary by the conduit 48 to which it is secured by a bracket 41. A rod 45, actuated by the movable end of the bellows, controls the butterfly valves 40 and 42, through racks and segments or other suitable means, to open valve 40 and close valve 42 as the bellows elongates. Thus, as the temperature of the heated air rises, the vapor pressure of the alcohol mixture increases, and the bellows 44 elongates, thereby decreasing the rate of flow of combustible mixture through the by-pass 37 and increasing the rate of flow through the conduit 24. This results in lowering the rate at which combustible mixture is supplied to the heating units 22, and thereby lowering the temperature of the air passing to the space being heated. Conversely, a decrease in the temperature at the outlet of the heater casing 20 causes the vapor pressure of the alcohol-ether mixture to lower to contract the bellows, decrease the rate of flow through the by-pass valve, and increase the rate of flow through the conduit 24, thereby increasing the rate at which combustible mixture is supplied to the heating units 22 and correspondingly increasing the temperature of the air passing from the heater.

The intake manifold vacuum of an airplane engine varies widely between full throttle and idling speed of the engine. The positive displacement pump 38 stabilizes the pressure at which combustible mixture is supplied to the heater, so that the heater will operate and the temperature of the heated air may be maintained constant at all times. The amount of combustible mixture consumed by the heater is so small in comparison with the amount used in the engine that the operation of the heater has no detectable effect upon the performance of the engine.

The improved thermostatic control regulates the output of the pump so that the proper amount of combustible mixture is supplied to the heating units 22 at all times. The heater is safe to operate and does not constitute a fire hazard, inasmuch as the heated portions of the system are separated from the engine and fuel supply by the fire wall 13, and a check valve 43 is provided to prevent the heater from backfiring to cause flame or hot gases to pass to the source of combustible mixture.

While I have shown and described a particular embodiment of my invention, it will be apparent to those skilled in the art that the invention may be embodied in numerous different forms without departing from the underlying principles of the invention. I, therefore, desire to include within the scope of the following claims all such equivalent structures as may be readily devised by those skilled in the art to accomplish substantially the results of my invention by substantially the same or equivalent means.

I claim:

1. In an internal combustion heating system for airplanes and similar conveyances having an internal combustion engine burning a combustible mixture, the combination of an internal combustion heater, means for forcing air through said heater into the space to be heated, a supercharger for supercharging the engine, a pump having an inlet and an outlet, a passage for supplying combustible mixture from said supercharger to said inlet, a passage for supplying combustible mixture from said outlet to said heater and having a valve therein for regulating the rate of flow of combustible mixture therethrough, a by-pass conduit connecting said outlet and inlet and having a valve therein for regulating the rate of flow therethrough, means responsive to the temperature of the air passing from said heater to operate said valves to decrease the rate of flow in the passage supplying combustible mixture to said heater and to increase the rate of flow in said by-pass when the temperature of the heated air rises above the desired value, and to increase and decrease said rates of flow, respectively, when the temperature of said air falls below said value.

2. In a heating system for airplanes and similar conveyances having an internal combustion engine consuming a combustible mixture, the combination of an internal combustion heating device, a casing enclosing said device, means for forcing air through said casing and conveying it to the space to be heated, a positive displacement pump, means to supply combustible mixture from said engine to the inlet of said pump, a passage supplying combustible mixture from the outlet of said pump to said device, a by-pass connecting the inlet and outlet of said pump and having a valve therein for regulating the rate of flow therethrough, and means responsive to the temperature of the air heated by said device to operate said valve to increase the rate of flow therethrough when the temperature of said air rises above the desired value and to decrease the rate of flow therethrough when said temperature falls below said value.

3. In an internal combustion heating system for airplanes and other conveyances having an internal combustion engine burning a combustible mixture, the combination of an internal combustion heater, means for forcing air through said heater into the space to be heated, a positive displacement pump having an inlet and an outlet, a passage for supplying combustible mixture from said engine to said inlet, a passage for supplying combustible mixture from said outlet to said heater, temperature responsive means for regulating the rate of flow through said last-named passage, responsive to the temperature of the heated air passing from said heater to regulate said flow to maintain said temperature substantially constant at the desired value.

4. In a heating system for airplanes and other conveyances having an internal combustion engine and a supercharger for said engine, the combination of an internal combustion heater, means for forcing air through said heater to the space to be heated, a positive displacement pump of sufficient capacity to supply combustible mixture at a uniform rate sufficient to operate said heater under all conditions of engine operation, a passage for supplying combustible mixture from said supercharger to the inlet of said pump, a passage for supplying combustible mixture from the outlet of said pump to said heater, and means for regulating the rate of flow of combustible mixture through said last-named passage.

5. In a heating system for aircraft provided with an internal combustion engine having means for supplying a combustible mixture thereto, the combination of an internal combustion type heater, means for forcing air through said heater into the space to be heated, a positive displacement pump having an inlet and an outlet, means connecting the inlet of said pump to the combustible mixture supply means for the aircraft engine, a conduit connecting the outlet of said pump with said heater for conveying the combustible mixture thereto, means forming a bypass from the outlet to the inlet of said pump, and means responsive to the temperature of the heated air passing from said heater to control the rate of flow through said bypass.

6. In a heating system for aircraft provided with an internal combustion engine having means for supplying a combustible mixture thereto, the combination of an internal combustion type heater, means for forcing air through said heater into the space to be heated, a positive displacement pump having an inlet and an outlet, means connecting the inlet of said pump to the combustible mixture supply means for the aircraft engine, a conduit connecting the outlet of said pump with said heater for conveying the combustible mixture thereto, means forming a bypass from the outlet to the inlet of said pump, regulating valves in said conduit and bypass respectively, and means responsive to the heat generated by said heater to operate said valves in reverse directions, thereby to limit the portion of the discharge of said pump supplied to said heater to an amount sufficient to maintain it at a predetermined operating temperature.

7. In a heating system for aircraft provided with an internal combustion engine having means for supplying a combustible mixture thereto, the combination of an internal combustion type heater, means for forcing air through said heater into the space to be heated, a positive displacement pump having an inlet and an outlet, means connecting the inlet of said pump to the combustible mixture supply means for the aircraft engine, a conduit connecting the outlet of said pump with said heater for conveying the combustible mixture thereto, means forming a bypass from the outlet to the inlet of said pump, valve means for determining the relative proportions of the discharge of said pump which are conveyed through said conduit and through said bypass respectively, and means responsive to the temperature of the heated air to control the operation of said valve means, whereby the rate of supply of combustible mixture to said heater will be controlled to maintain the air heated thereby at a relatively constant temperature.

HENRY J. DE N. McCOLLUM.